A. BRINKERHOFF.
FARM GATE.
No. 7,187.
Reissued June 27, 1876.
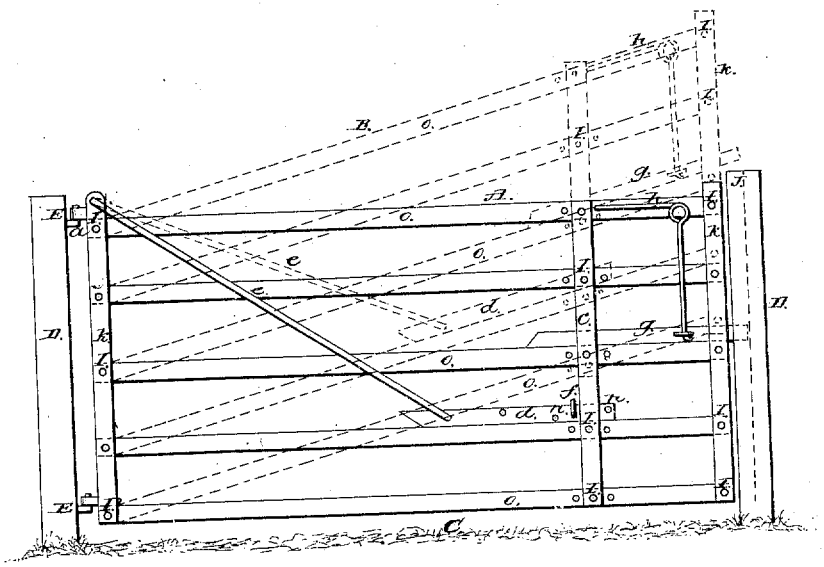
Attest:
Peter Stein
J. K. Baughman
Inventor:
Amos Brinkerhoff
N. PETERS, PHOTO-LITHOGRAPHER, WASHINGTON, D. C.

UNITED STATES PATENT OFFICE.

AMOS BRINKERHOFF, OF GOLDEN CORNERS, OHIO.

IMPROVEMENT IN FARM-GATES.

Specification forming part of Letters Patent No. 170,517, dated November 30, 1875; reissue No. 7,187, dated June 27, 1876; application filed February 11, 1876.

*To all whom it may concern:*

Be it known that I, AMOS BRINKERHOFF, of Golden Corners, in the county of Wayne and State of Ohio, have invented certain new and useful Improvements in Gates for Land Inclosures; and I do hereby declare that the following is a full, clear, and exact description thereof, which, with the accompanying drawings, hereby made a part of this specification, fully shows my said invention and improvement.

The object of my invention is to construct a swinging farm-gate, which can be easily elevated for the passage of small stock beneath it, and also for swinging clear of obstacles, as will be hereinafter described.

The drawings, in full lines, represent the gate when caught in the ordinary situation. The dotted lines represent the gate when elevated and latched. By the combination of the girt-brace *e*, slide-bar *d*, slide-bar pin *f*, vertical slots *c* and *k*, latch *g*, latch-spring *h*, screw-bolts I, groove J, bars *o*, and gate-posts D, the gate can be elevated and latched, as shown by dotted drawing B, at any elevation desired, by a proper adjustment of the slide-bar pin *f* in the perforations *p*, in slide-bar *d*, and the gate can be locked in such position, by placing the slide-bar pin *r* in a perforation, *p*, in front of the vertical slots *c;* and if it be desired to keep the gate locked down, as represented in full lines as in drawing A, it can readily be done by the insertion of slide-bar pin *r* in slide-bar *d*, on the rear side of vertical slots *c*, the latch *g*, by entering the groove J in post D, preventing the horizontal swinging of the gate.

If it be desired to leave the gate open, it can prevented from swinging by removing slide-bar pin *f*, which being done the front end of the gate will drop to the ground, and, if desired, can be there secured by placing slide-bar pin *r* in slide-bar *d* at rear side of vertical slots *c*, as before stated.

The girt-brace *e* may be made of wood or iron, and should be pivoted to the rear vertical slots at I, at or near the top, and the lower and forward end pivoted to the rear end of slide-bar *d*. The girt-brace is to be double—that is, a brace to pass on each side of the bars *o*.

The latch *g* is kept in place in the groove J, in the gate-post D, by the spring *h*, which may be made of ordinary steel-wire. It must be pushed back to withdraw its outer end out of the groove J.

What I claim is—

The combination of the sliding bar *d*, girt-brace *e*, sliding-bar pins *f* and *n*, and pivoted vertical slots *c* and bars *o*, substantially as set forth.

In testimony whereof I hereunto subscribe my name this 8th day of February, A. D. 1876, in presence of two witnesses.

AMOS BRINKERHOFF.

Witnesses:

PETER STAIR,

J. W. BAUGHMAN.